(12) United States Patent
Soundararajan et al.

(10) Patent No.: US 11,463,241 B2
(45) Date of Patent: Oct. 4, 2022

(54) TRANSMITTING OR RECEIVING BLOCKCHAIN INFORMATION

(71) Applicant: Hewlett Packard Enterprise Development LP, Houston, TX (US)

(72) Inventors: Abilash Soundararajan, Bangalore (IN); Michael Reid Tennefoss, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 16/757,710

(22) PCT Filed: Oct. 20, 2017

(86) PCT No.: PCT/US2017/057554
§ 371 (c)(1),
(2) Date: Apr. 20, 2020

(87) PCT Pub. No.: WO2019/078877
PCT Pub. Date: Apr. 25, 2019

(65) Prior Publication Data
US 2020/0389294 A1    Dec. 10, 2020

(51) Int. Cl.
*H04L 9/08* (2006.01)
*H04L 9/06* (2006.01)
*G06Q 20/36* (2012.01)
*G06Q 20/06* (2012.01)

(52) U.S. Cl.
CPC ............. *H04L 9/08* (2013.01); *G06Q 20/06* (2013.01); *G06Q 20/36* (2013.01); *H04L 9/0643* (2013.01); *H04L 2209/38* (2013.01)

(58) Field of Classification Search
CPC ..... H04L 9/08; H04L 9/0643; H04L 2209/38; G06Q 20/06; G06Q 20/36
See application file for complete search history.

(56) References Cited

U.S. PATENT DOCUMENTS

| 8,042,163 | B1 | 10/2011 | Karr et al. |
| 9,569,771 | B2 | 2/2017 | Lesavich et al. |
| 9,635,000 | B1 | 4/2017 | Muftic |
| 9,648,007 | B1 | 5/2017 | Sterling et al. |
| 9,722,790 | B2 | 8/2017 | Ebrahimi |

(Continued)

FOREIGN PATENT DOCUMENTS

| CN | 105659558 A | 6/2016 |
| CN | 109417465 A | 3/2019 |

(Continued)

OTHER PUBLICATIONS

Extended European Search Report for EP Patent Application No. 17928996.2, dated May 4, 2021, 9 pages.

(Continued)

*Primary Examiner* — Yonas A Bayou
(74) *Attorney, Agent, or Firm* — Trop, Pruner & Hu, P.C.

(57) ABSTRACT

In some examples, an electronic device includes a non-transitory storage medium storing blockchain information, a processor to compute a secure representation of the blockchain information based on applying a cryptographic function to the blockchain information, and a transmitter to transmit a beacon comprising the secure representation of the blockchain information.

17 Claims, 3 Drawing Sheets

(56) References Cited

U.S. PATENT DOCUMENTS

| | | | |
|---|---|---|---|
| 9,980,137 B2* | 5/2018 | South | H04W 4/02 |
| 10,194,320 B1 | 1/2019 | Egner et al. | |
| 2005/0015591 A1 | 1/2005 | Thrash et al. | |
| 2006/0236382 A1 | 10/2006 | Hinton et al. | |
| 2012/0150750 A1 | 6/2012 | Law et al. | |
| 2013/0104211 A1 | 4/2013 | Nandakumar | |
| 2013/0333009 A1 | 12/2013 | Mackler | |
| 2014/0059213 A1 | 2/2014 | Ollikainen et al. | |
| 2014/0215594 A1 | 7/2014 | Lambert | |
| 2014/0380040 A1 | 12/2014 | Albahdal et al. | |
| 2016/0055322 A1 | 2/2016 | Thomas | |
| 2016/0088424 A1 | 3/2016 | Polo et al. | |
| 2016/0342989 A1 | 11/2016 | Davis | |
| 2017/0076306 A1 | 3/2017 | Snider et al. | |
| 2017/0091397 A1 | 3/2017 | Shah | |
| 2017/0132619 A1 | 5/2017 | Miller et al. | |
| 2017/0132620 A1 | 5/2017 | Miller et al. | |
| 2017/0132625 A1 | 5/2017 | Kennedy | |
| 2017/0132630 A1 | 5/2017 | Castinado et al. | |
| 2017/0134429 A1 | 5/2017 | Gustafsson | |
| 2017/0163733 A1 | 6/2017 | Grefen et al. | |
| 2017/0177898 A1 | 6/2017 | Dillenberger | |
| 2017/0228371 A1 | 8/2017 | Seger, II | |
| 2017/0230375 A1 | 8/2017 | Kurian | |
| 2017/0230791 A1 | 8/2017 | Jones | |
| 2017/0232300 A1 | 8/2017 | Tran et al. | |
| 2017/0236123 A1 | 8/2017 | Ali et al. | |
| 2017/0243208 A1 | 8/2017 | Kurian et al. | |
| 2017/0262902 A1 | 9/2017 | Weston et al. | |
| 2017/0302450 A1 | 10/2017 | Ebrahimi | |
| 2017/0330174 A1 | 11/2017 | Demarinis et al. | |
| 2018/0060496 A1 | 3/2018 | Bulleit et al. | |
| 2018/0174122 A1 | 6/2018 | Mattingly et al. | |
| 2018/0182052 A1 | 6/2018 | Panagos | |
| 2018/0316502 A1* | 11/2018 | Nadeau | H04L 9/0637 |
| 2018/0337771 A1 | 11/2018 | Baker et al. | |
| 2018/0349572 A1 | 12/2018 | Chen et al. | |
| 2019/0081796 A1* | 3/2019 | Chow | G06Q 20/3827 |
| 2019/0215162 A1* | 7/2019 | Dickenson | H04L 9/3247 |
| 2019/0268284 A1 | 8/2019 | Karame et al. | |
| 2019/0280875 A1* | 9/2019 | Ragnoni | H04L 9/0643 |
| 2019/0289019 A1* | 9/2019 | Thekadath | G06F 16/27 |

FOREIGN PATENT DOCUMENTS

| | | |
|---|---|---|
| EP | 3200167 A1 | 8/2017 |
| EP | 3396576 A1 | 10/2018 |
| KR | 10-1701131 B1 | 2/2017 |
| KR | 10-1723405 B1 | 4/2017 |
| KR | 10-1767534 B1 | 8/2017 |
| WO | 2015/187608 A1 | 12/2015 |
| WO | 2016/202952 A1 | 12/2016 |
| WO | 2017/054985 A1 | 4/2017 |
| WO | 2017/079218 A1 | 5/2017 |
| WO | 2017/104899 A1 | 6/2017 |
| WO | 2017/107976 A1 | 6/2017 |
| WO | 2017/127564 A1 | 7/2017 |
| WO | 2017/131788 A1 | 8/2017 |

OTHER PUBLICATIONS

Extended European Search Report for EP Patent Application No. 17929402.0, dated Mar. 5, 2021, 8 pages.

Basic Attention Token, "Announcing a new Blockchain-Based Digital Advertising Platform", available online at <https://medium.com/@AttentionToken/announcing-a-new-blockchain-based-digital-advertising-platform-775203933c44>, Mar. 23, 2017, 4 pages.

Bitcoin Exchange Guide, "ATMChain—Smart Media Advertising Blockchain Network ICO?", available online at <https://bitcoinexchangeguide.com/atmchain/>, Aug. 16, 2017, 6 pages.

Blockchained Technology, "Data Storage with Blockchain Technology", available online at <http://blockchained.blogspot.in/2015/03/data-storage-with-blockchain-technology.html>, Mar. 17, 2015, 4 pages.

Ethereum, "When would it make sense to use node server for an application using smart contracts?", available online at <https://ethereum.stackexchange.com/questions/25830/when-would-it-make-sense-to-use-node-server-for-an-application-using-smart-contr>, Sep. 7, 2017, 4 pages.

Jai Singh Arun, "Reimagining the Future of Identity Management With Blockchain", available online at <https://securityintelligence.com/reimagining-the-future-of-identity-management-with-blockchain/>, Mar. 7, 2017, 6 pages.

Moinet et al., "Blockchain based trust & authentication for decentralized sensor networks", Jun. 6, 2017, pp. 1-6.

Peter Saint-Andre, "How can blockchains improve the Internet of Things?", available online at <https://coincenter.org/entry/how-can-blockchains-improve-the-internet-of-things>, Oct. 11, 2016, 8 pages.

Robert Hof, "How MetaX Plans to Use Blockchain to Stop Ad Fraud", available online at <https://www.forbes.com/sites/roberthof/2017/03/21/how-metax-plans-to-use-blockchain-to-stop-ad-fraud/#4088d01d59da>, Mar. 21, 2017, 2 pages.

Search Report and Written Opinion received for PCT Patent Application No. PCT/US2017/057554, dated Jul. 13, 2018, 14 pages.

Search Report and Written Opinion received for PCT Patent Application No. PCT/US2017/057556, dated Jul. 4, 2018, 8 pages.

Search Report and Written Opinion received for PCT Patent Application No. PCT/US2017/057558, dated Jul. 4, 2018, 9 pages.

Search Report and Written Opinion received for PCT Patent Application No. PCT/US2017/057560, dated Jul. 20, 2018, 12 pages.

Tran et al., "Regerator: a Registry Generator for Blockchain", CAiSE 2017 Forum and Doctoral Consortium Papers, 2017, pp. 81-88.

Kivihaiju ("Enforcing Role-Based Access Control with Attribute-Based Cryptography in MLS Environments", Puolustusvoimien tutkimuslaitos, Jun. 13, 2017, 237 pages) (Year: 2017).

\* cited by examiner

TRANSMITTING OR RECEIVING BLOCKCHAIN INFORMATION

BACKGROUND

The proliferation of network-enabled electronic devices, and the availability of new communication and data exchange technologies, have made possible new methods of device-to-device, device-to-user, and device-to-application interactions. For example, information can be collected directly from individual electronic devices. Alternately, information can be obtained indirectly from other data sources about the electronic devices or users, products, programs, or other components associated with the electronic devices.

BRIEF DESCRIPTION OF THE DRAWINGS

Some implementations of the present disclosure are described with respect to the following figures.

Figure 1:
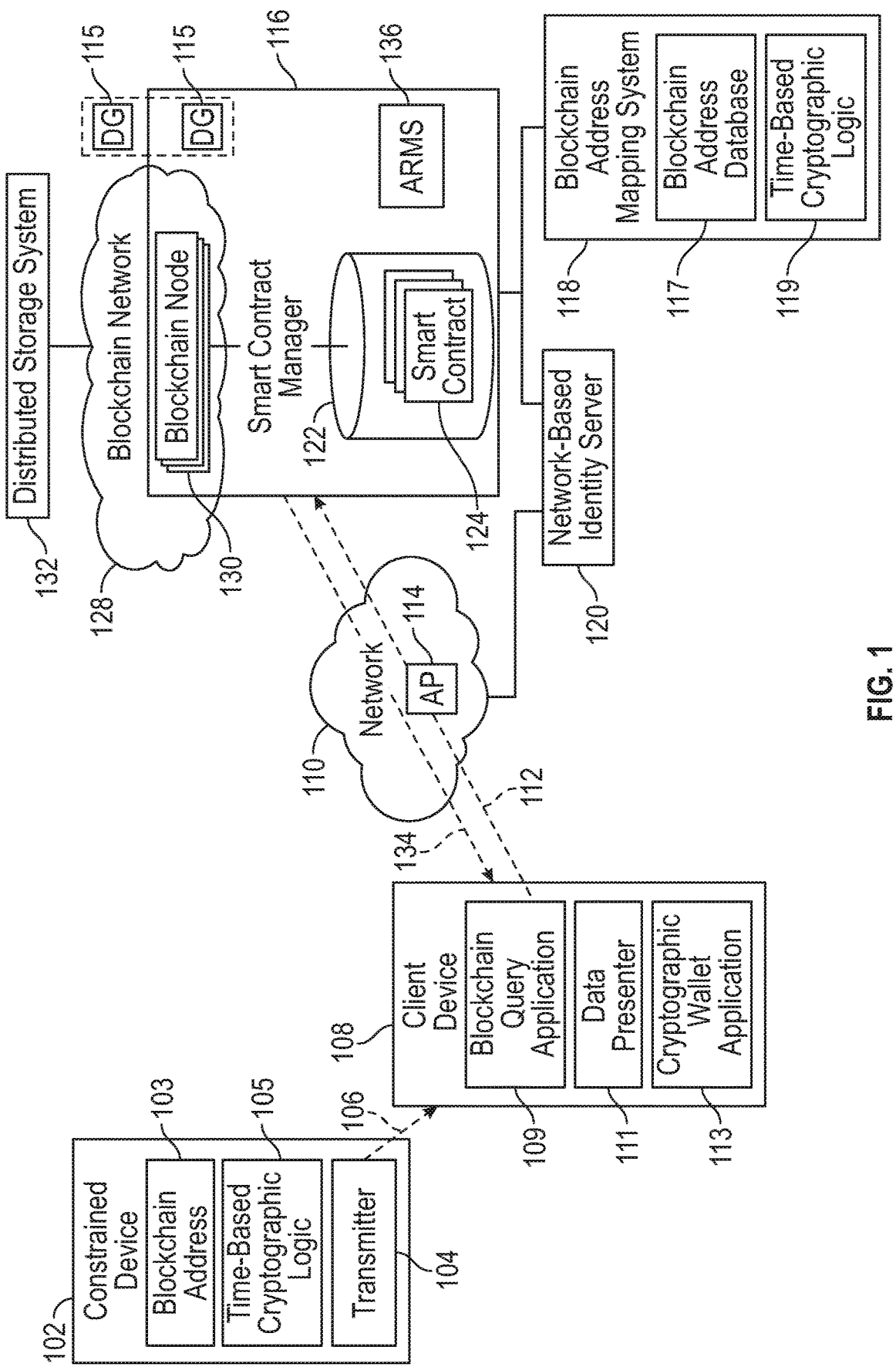
FIG. 1 is a block diagram of an arrangement that includes a constrained device, a client device, and various backend nodes according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A "constrained device" can refer to a device that has restricted computing resources (e.g., processing resources, storage resources, communication resources, etc.) and/or power available to the device. A constrained device is distinguished from more general purpose computing devices such as smartphones, tablet computers, notebook computers, desktop computers, server computers, and so forth. A constrained device may use wired communications (e.g., copper, coaxial cable, and/or optical fiber communications) and/or wireless communications (e.g., radio frequency, infrared, ultrasonic, infrasonic, and/or laser).

As discussed further below, in contexts where blockchain technologies are used, a constrained device can be constrained in the processing of a blockchain. The concept of a blockchain is explained further below.

Examples of constrained devices include sensors, actuators, cameras, radio frequency identification (RFID) tags, and so forth. In some examples, constrained devices can include devices that transmit information according to an advertisement protocol using Bluetooth Low Energy (BLE) or cellular technology or other wireless technology. Generally, an advertisement protocol allows a device, such as a constrained device, to advertise information that can be used for some specified purpose.

In some examples, electronic devices such as constrained devices can transmit data useable to initiate, automate, and/or augment interactions in a physical world among entities (e.g., users, machines, programs, etc.), where such data are known as a "beacon." A beacon can be in the form of a data packet, multiple data packets, a signal, and so forth.

For example, the information in a transmitted beacon can be used in any of the following interactions: purchasing products, obtaining further information about a product or its attributes, tracking inventory, obtaining healthcare services, detecting theft, performing law enforcement activities (e.g., a law enforcement officer can obtain information of a driver based on information in a beacon), purchasing insurance policies, and so forth.

The authenticity of a beacon and the transmitted data have to be ascertained prior to using the data to prevent the ingestion of malicious, false, misleading, or otherwise untrustworthy data. For example, such untrustworthy data may be used by a malicious entity in an attempt to manipulate interactions and/or to obtain information that would not otherwise be provided. Additionally, information transmitted by electronic devices can be subject to copying, playback, and malicious use by hackers.

In accordance with some implementations of the present disclosure, techniques or mechanisms are provided to enable an electronic device (such as a constrained device) to transmit blockchain information to allow for verification that the transmitted beacon is trustworthy.

Moreover, in some examples, rather than transmit the blockchain information (including a blockchain address of the wireless device) in the clear, the electronic device can compute a secret value based on applying a cryptographic function to the blockchain address that can be used in a query sent to another device to obtain further information relating to the electronic device. The secret value is a secure representation of the blockchain address (and/or any other blockchain information). When interactions using a blockchain address as an identity between entities (e.g., human users, machines, programs, etc.) occur in the open (i.e., not over a secure connection), then passive sniffers or other attacking devices may be able to gather personal information, location information, sensitive information belonging to an organization, and so forth. By using the secure representation of the blockchain address (and/or any other blockchain information), the interactions can be secured from exposure to unauthorized entities.

The information relating to the electronic device that is obtained in response to the transmitted secure representation of the blockchain information can be used in any of various different types of interactions, including those discussed further above. As used here, "information relating to the electronic device" can refer to information about an entity or service that is associated with the electronic device. For example, the information can include information about the electronic device. Alternatively, the information can include information about a product to which the electronic device is attached or otherwise associated. In this latter example, the electronic device can include a tag attached to the product, or alternatively, the electronic device can be placed in the proximity of the product. The "product" can refer to a product to be sold in a retail setting, a product that is being demonstrated, a product that is being transported, an artifact being displayed (such as in a museum, a building, etc.), equipment being tracked (e.g., surgical equipment), and so forth. As further examples, the product can be a vehicle that has been pulled over by a law enforcement officer, or a vehicle for which an insurance policy is to be purchased.

In additional examples, information relating to the electronic device can include information about a user with which the electronic device is associated. For example, the user may be a driver of a vehicle that has been pulled over, and a police officer may desire to obtain historical driver information (e.g., prior violation tickets, outstanding arrest warrants, etc.). In other examples, a user may wish to purchase insurance, and the information about the user can be used to set an insurance rate for the user.

Although specific examples of information relating to the electronic device are provided above, it is noted that in other examples, the information can include other example information.

FIG. 1 is a block diagram of an example arrangement that includes a constrained device 102 that has a transmitter 104 to transmit a beacon 106. Although just one constrained device 102 is shown in FIG. 1, it is noted that in other examples, multiple constrained devices 102 can be present, where the constrained devices can be provided at different locations.

Although reference is made to a constrained device, it is noted that techniques or mechanisms according to the present disclosure can also be applied to other types of electronic devices that can transmit information.

The beacon 106 can be transmitted by the transmitter 104 of the constrained device 102 using any of various transmission technologies, including for wireless constrained devices, any or some combination of the following: Bluetooth, BLE, radio-frequency identification (RFID), cellular, 802.15.4, 802.11 Wi-Fi, Near-Field Communication (NFC), LoRa, Sigfox, and so forth. Note that in examples where wired constrained devices are used, beacons can be transmitted over wired links.

The beacon 106 includes advertised information that can be received by nearby devices, including the client device 108. "Nearby" devices can include devices within range (e.g., wireless range) of the constrained device 102, devices that are part of a logical or physical group, devices within an organization, devices on a network (such as a mesh network in which a beacon can be repeated by intermediary devices to reach more distant client devices), and so forth.

The client device 108 can include any type of computing device that is able to wirelessly receive information from the constrained device 102, or to receive information over a wired link from a wired electronic device, and that is able to communicate over a network 110. Examples of the client device 108 can include any or some combination of the following: a smartphone, a tablet computer, a notebook computer, a desktop computer, a wearable device (e.g., smart eyeglasses, a head-mounted electronic device, a smart watch, etc.), a game appliance, a home appliance, a vehicle, or any other type of electronic device.

Although just one client device 108 is shown in FIG. 1, it is noted that in other examples, multiple client devices 108 can be present. The multiple client devices 108 can receive the beacon 106 from the constrained device 102. For example, different client devices can be associated with different users. Alternatively, the client device 108 or multiple client devices 108 can receive beacons from multiple constrained devices 102.

In some examples, the network 110 can include a wireless network that allows for the client device 108 to wirelessly communicate with other devices. In alternative examples, the network 110 can include a wired network to which the client device 108 has a wired connection. In further examples, the network 110 can include both a wireless network and a wired network.

Blockchain information is used in the context of blockchain technology. A blockchain refers to a distributed collection of records (referred to as "blocks") that are linked and secured cryptographically in a distributed manner. A blockchain can also refer to a continuous and unbroken ledger of blocks. The blocks of the blockchain can be distributed across a large number of computing devices. Each block can include various information, including transaction data for a transaction represented by the block, a timestamp, and a reference to a previous block in the blockchain. As new transactions occur, new blocks are created for the new transactions and added to the blockchain. A blockchain (which form a distributed transaction ledger) records transactions among multiple entities in a verifiable and permanent way. Once a block is created and the data of the block recorded, the block cannot be altered without alteration of subsequent blocks.

Multiple entities can see the transaction ledger, but because of the decentralized nature of the distributed collection of blocks records are protected against hacking or corruption by a malicious entity. The validation of each block added to the blockchain is performed by every node by applying and/or validating hashing functions. If the validation fails, then that node drops the block from the blockchain.

A blockchain address refers to an identifier. In some examples, a blockchain address is analogous to an account number. An entity (such as a user or a device) can include one blockchain address, or can have multiple blockchain addresses. In some examples, a blockchain address can be generated based on use of a pair of a public key and a private key associated with an entity.

As used here, the blockchain address of an entity associated with the constrained device can refer to the constrained device's blockchain address, or can refer to the blockchain address of a product, a machine, a program, a human user, or another entity related to the constrained device. More generally, a blockchain address of an entity associated with a device can refer to information that is used to identify the entity associated with a device.

More generally, a blockchain information can refer to any information that can be used in a blockchain process. A blockchain process can refer to a process that uses a blockchain to store transactions in blocks of the blockchain. A transaction can refer to any event (e.g., an activity, data storage, program execution, etc.).

In accordance with some implementations of the present disclosure, the beacon 106 contains blockchain information, including a blockchain address 103 of an entity associated with the constrained device 102. The blockchain address 103 can be pre-configured in the constrained device 102, such as when the constrained device 102 is initially set up with firmware and/or software (more generally, machine-readable instructions), and/or when the constrained device 102 is being initialized or provisioned. Alternatively, the blockchain address 103 can be obtained by the constrained device 102 over a secure connection from an external local or remote source.

The blockchain address 103 can be stored in a storage medium of the constrained device 102 in a secure manner. For example, the blockchain address 103 can be stored in encrypted form in the constrained device 102.

If a blockchain address (or other blockchain information) were included in the beacon 106 in the clear (i.e., no encryption or other obfuscation technique is applied to the blockchain information), then a hacker may obtain the blockchain information for unauthorized reuse of the blockchain address for malicious purposes.

In accordance with some implementations of the present disclosure, instead of sending the blockchain address of an entity associated with the constrained device 102 in the clear, the blockchain address can be secured by applying a cryptographic function on the blockchain address. Applying the cryptographic function on the blockchain address results in computation of a secret value that is included in the beacon 106. More generally, the beacon 106 includes a secure representation of the blockchain address.

Although reference is made to a secure representation of a blockchain address, it is noted that techniques or mechanisms according to some implementations of the present disclosure can be applied to other blockchain information.

In some examples, the constrained device 102 includes a time-based cryptographic logic 105 (which can be implemented with a hardware processing circuit or machine-readable instructions) to apply a time-based cryptographic function on the blockchain address 103. The inputs to the time-based cryptographic function includes a timestamp (indicating the time at which the cryptographic function is being applied) and the blockchain address 103.

In operation, the time-based cryptographic logic 105 can retrieve an encrypted version of the blockchain information 103 from a storage medium of the constrained device 102, decrypt the encrypted version of the blockchain information to obtain decrypted blockchain information, and apply the time-based cryptographic function to the decrypted blockchain information to produce the secure representation of the blockchain information.

The time-based cryptographic function can include a time-based one-time password (TOTP) technique in some examples, which computes a secret value (referred to as a one-time password) using the timestamp and an encryption key. TOTP is an example of a hash-based message authentication code (HMAC) technique.

In other examples, other types of cryptographic functions can be used.

In addition to the secure representation of the blockchain address of an entity associated with the constrained device 102, the beacon 106 can further include other information, such as a description of the constrained device 102 or a description of an entity associated with the constrained device 102, and so forth.

The client device 108 includes a blockchain query application 109 that can generate a query 112 based on the information in the beacon 106. A "query" can refer to a message (or collection of messages), an information element (or collection of information elements), or any other type of information that is submitted to trigger a response from another device.

In some examples, the client device 108 can include a data presenter 111, such as a display or an audio output device. The data presenter 111 can present data for consumption by a user of the client device 108.

Additionally, in some examples, the client device 108 can include a cryptographic currency wallet application 113, which can be used to make payment for a transaction or to make payment for accessing data (such as by submitting the query 112) or to make payment for any other purpose.

The query 112 can be submitted by the client device 108 to the network 110. In some examples, the network 110 can include an access point (AP) 114, or multiple APs. An AP can refer to an access network node that can be used by an electronic device to gain access to a network. In some examples, the AP 114 can be part of a wireless network (e.g., a Wi-Fi network). In other examples, the AP 114 can refer to a Wide Area Network) WAN or Low Power Wide Area Network (LPWAN) base station or transmission system base station, another low power long range access network (e.g., Lora and Sigfox) node, or an access node of a cellular network.

In examples where the network 110 is a wired network, the AP 114 can include a bridge, switch or router (or multiple switches/routers) to allow for communication of data with other nodes.

In some examples according to the present disclosure, the query 112 can be sent through the network 110 to a data governance system 115, which can be implemented as a computing node or a distributed arrangement of computing nodes. Multiple data governance systems 115 are shown in FIG. 1. In some examples, a data governance system 115 can be part of a smart contract manager 116, while in other examples a data governance system 115 can be external of the smart contract manager 116. In the ensuing discussion, reference to "the governance system 115" can be to the governance system in the smart contract manager 116 and/or outside the smart contract manager 116.

The smart contract manager 116 can be implemented using a computing node (or a distributed arrangement of computing nodes). Although just one smart contract manager 116 is shown in FIG. 1, it is noted that in other examples, there can be multiple smart contract managers.

The smart contract manager 116 can also include blockchain nodes 130 (also referred to as full nodes) that are part of a blockchain network 128.

The smart contract manager 116 implements enforcement of smart contracts. A smart contract provides logic and rules executed by computing device(s) for a blockchain to automate terms of a contract among multiple entities. A smart contract can include blockchain addresses of the parties of the smart contract, information relating to terms of the smart contract, and other information.

In some examples, a smart contract can be established among the multiple entities, such as a client entity associated with the client device 108 and a client entity associated with stored information that the client device 108 is seeking to access. For example, the client device 108 can include a computer in a police vehicle, and the information sought is the information that is maintained by the Department of Motor Vehicles (DMV) of a particular jurisdiction. The smart contract in this example would be between the police department and the DMV. The smart contract can govern whether or not users of the police department (including police officers, dispatchers, etc.) are allowed to access DMV information, and if so, what types of information are allowed to be accessed. The smart contract can also specify other terms and rules pertaining to access of the DMV information by users of the police department.

In other examples, a smart contract can be established between other types of entities, and can include terms governing access of other types of information.

In some examples, the information that is being sought by the client device 108 can include information stored in a blockchain (e.g., in blocks of the blockchain). For example, in the context of a DMV, the information stored in the blocks of a blockchain can include historical information about a driver, including traffic violation tickets, arrest warrants, information pertaining to whether payment has been made of the traffic violation tickets, and so forth. The issuance of a traffic violation ticket, the issuance of an arrest warrant, the payment of a traffic violation ticket, and so forth, each constitutes a distinct transaction that can be represented by a respective block of the blockchain.

In other examples where the client device 108 is a shopper at a retail store, and the information that is sought by the user of the client device 108 is information that is maintained by a product manufacturer or by the retail store, the smart contract can be between the user of the client device 108 and the retail store/product manufacturer. In such examples, information pertaining to different products can be maintained by the retail store/product manufacturer in the blocks of a blockchain.

The smart contract manager 116 is a central entity that provides centralized management for purposes of enforcing terms of a smart contract. Note that the smart contract manager 116 is a centralized entity that is used in the context of a distributed storage of information in the blocks of a blockchain.

The query 112 includes the secure representation of the blockchain address of an entity associated with the constrained device 102. The query 112 further specifies an identifier of a client entity associated with the client device 108. As used here, an identifier of a client entity associated with a client device can refer to an identifier that identifies the client device, or an identifier that identifies an entity associated with the client device, such as a program executing in the client device, the user of the client device, or any other entity that is related to the client device.

Since the query 112 includes a secure representation of the blockchain address of an entity associated with the constrained device 102, the smart contract manager 116 interacts with a blockchain address mapping system 118 to obtain the clear version of the blockchain address. The blockchain address mapping system 118 includes a blockchain address database 117 of registered blockchain addresses, and a time-based cryptographic logic 119 that generates a representation of a blockchain address in the same manner as the time-based cryptographic logic 105 of the constrained device 102.

The blockchain address database 117 stores clear versions of blockchain addresses that have been provisioned at respective constrained devices.

The constrained device 102 is provisioned with a blockchain address (103) and the time-based cryptographic logic (105) from the blockchain address mapping system 118. Once provisioned and synchronized, respective dynamic addresses (computed respectively by the time-based cryptographic logic 105 in the constrained device 102 and by the time-based cryptographic logic 119 in the blockchain address mapping system 118) are the same in both the constrained device 102 and the blockchain address mapping system 118. A "dynamic address" refers to a secure representation of a blockchain address as computed by the time-based cryptographic logic (105 or 119).

Due to the constrained device 102 and the blockchain address mapping system 118 not being exactly time synchronized, there may be a difference in time synchronization between the dynamic addresses in the constrained device 102 and the blockchain address mapping system 118. For example, at time x, the constrained device 102 produces dynamic address 54367, while the blockchain address mapping system 118 produces dynamic address 54367. At time x+5, the constrained device 102 produces dynamic address 54367, while the blockchain address mapping system 118 produces dynamic address 54368. However, at time x+6, the constrained device produces dynamic address 54368, while the blockchain address mapping system 118 produces dynamic address 54368. Thus, in the foregoing example, at time x+5, the dynamic addresses at the constrained device 102 and the blockchain address mapping system 118 are not same due to time synchronization. To address this issue, the blockchain address mapping system 118 can configure a time offset period that represents the difference in time synchronization between the constrained device and the blockchain address mapping system 118.

The blockchain address database 117 can include a lookup function that can map different secure representations of blockchain addresses to respective clear versions of the blockchain addresses. For example, the lookup function can be in the form of a lookup table (or other lookup data structure) having entries, each entry mapping between a corresponding secure representation of a blockchain address and a respective clear version of the blockchain address. The lookup function takes the secure representation of the blockchain address of the query 112 and retrieves the corresponding clear version of the blockchain address, which is returned to the smart contract manager 116. By checking with the blockchain address mapping system, the smart contract manager 116 is able to determine the identity (in the form of a clear version of the blockchain address) of the constrained device 102 about which information is requested.

In some examples, the smart contract manager 116 can interact with a network-based identity server 120, which can be implemented as a computing node or a distributed arrangement of computing nodes. The smart contract manager 116 can provide the following information obtained based on the query 112 to the network-based identity server 120: the identifier of a client entity associated with the client device 108, and the blockchain address (the clear version) of an entity associated with the constrained device 102. The network-based identity server 120, can identify a role of the entity associated with the client device 108. Based on the identified role and the blockchain address, the network-based identity server 120 is able to identify a corresponding smart contract. A "role" of an entity can refer to information indicating a responsibility of or task(s) to be performed by the entity. For example, a human user can have a role of a police officer, a dispatcher, a shopper, a patient, a healthcare provider, etc. As another example, a machine or program can have a role of tracking inventory, managing an information technology infrastructure, and so forth.

Note that the smart contract manager 116 can interact with the blockchain address mapping system 118 and the network-based identity server 120 in parallel, since the two processes are independent of one another.

In some examples, the smart contract manager 116 can maintain a data repository 122 (stored in a storage device or a distributed arrangement of storage devices) that includes mapping information to map various entity roles and blockchain addresses to corresponding smart contracts 124 that can be stored in the data repository 122 or a different data repository. Using the blockchain address and the identifier of a client entity associated with the client device 108 obtained from the query 112 by the smart contract manager 116, the network-based identity server 120 is able to identify the corresponding smart contract 124 from the data repository 122 and return the smart contract 124 to the smart contract manager 116.

In other examples, instead of interacting with the network-based identity server 120 to identify a role of the client entity associated with the client device 108 and a smart contract corresponding to the identified role and the blockchain address, the smart contract manager 116 can perform the foregoing tasks itself.

The smart contract manager 116 can check the rules of the smart contract to determine whether information sought by the query 112 can be shared with the client device 108 (i.e., whether the client device 108 has authorization to receive the information sought by the query 112). For example, the smart contract can specify that information associated with a specific blockchain address can only be shared with certain users or client devices or other entities. Also, the smart contract can specify what information is to be shared.

If the smart contract manager 116 determines that the requested information sought by the query 112 can be shared with the client device 108, the smart contract manager 116 sends the clear version of the blockchain address (126) to a blockchain network 128. The blockchain address 126 can be used to retrieve relevant records from a blockchain.

The blockchain network 128 can include blockchain nodes 130 (also referred to as "full nodes"), which are distributed nodes that perform processing relating to the blockchain. In some examples, rather than store actual data, a block of a blockchain may include a pointer to a storage location in a distributed storage system 132 (including a distributed arrangement of storage nodes, which can be referred to as a swarm in some examples) that stores the actual data corresponding to the block.

Blocks in the blockchain have some amount of information about each transaction, such as which accounts are involved, how much currency was transferred, some detail about the transaction, a timestamp representing a time of the transaction, some data and a reference to the external distributed storage system 132 that contains additional data. A full node that is part of the blockchain network 128 can retrieve and share the additional data from the distributed storage system 132. The full node can send a retrieve request to the appropriate distributed storage system (e.g., 132) based on the blockchain address. The retrieve request is validated, and any charges for requesting and obtaining the requested data can be applied. Once validated and any charges collected, the requested data can be returned from the distributed decentralized storage system 132 to the full node, which sends the requested data to the smart contract manager 116.

The requested data relating to the blockchain address 126 is returned back to the smart contract manager 116 by the blockchain network 128. The smart contract manager 116 can then decide, based on the smart contract, which selected information (which can include all of the relevant data or just a subset of the relevant data) is to be sent back to the client device 108 in response to the query 112. The smart contract manager 116 sends a response (134) containing the selected information back to client device 108.

At the client device 108, the selected information in the response (134) can be used for the corresponding interaction, such as a user deciding whether or not to purchase a product based on the selected information, a user viewing further information about a product or its attributes, the client device 108 or a different device tracking inventory based on the selected information, a user (e.g., healthcare provider such as a doctor or nurse) providing a healthcare service to a patient based on the selected information, the client device 108 or a different device detecting theft based on the selected information, a law enforcement officer performing a law enforcement activity based on the selected information, a user purchasing an insurance policy or an insurance company setting a rate for an insurance policy based on the selected information, and so forth.

In some examples, the smart contract manager 116 includes an authorization request monitoring system (ARMS) 136 to detect unauthorized use of a secure representation of a blockchain address. The ability to detect unauthorized use of a secure representation of a blockchain address can have applications in law enforcement, security, anti-fraud efforts, and so forth. This ability also aids in securing the integrity of blockchain addresses and the integrity of interactions between entities represented in a blockchain network.

The authorization request monitoring system (ARMS) 136 can be part of the smart contract manager 116, and can include a hardware processing circuit or a combination of machine-readable instructions and the hardware. The ARMS 136 can be separate from the smart contract manager 116, and can be implemented on a computing node (or multiple computing nodes) separate from the computing node(s) of the smart contract manager 116. The ARMS 136 can check to ensure that a secure representation of a blockchain address that has already been used once (such as in the query 112 sent from the client device 108 to the smart contract manager 116) is not reused again. If the ARMS 136 detects that a particular secure representation of a blockchain address has been used more than once, then the unauthorized use alert logic 136 can take a security action. The security action can include any or some combination of the following: issuing an alert to a target entity (e.g., a network administrator or other entity), rejecting the query 112 by sending an error response back to the client device 108, quarantining the client device 108, backlisting the client device 108, or another security action.

Additionally, in some examples, a particular secure representation of a blockchain address can be associated with a specific time range and/or a specific location. If the ARMS 136 detects that the particular secure representation of a blockchain address is used outside the specific time range and/or away from the specific location (e.g., a specific geographic region, a specific location in a network, etc.), then the ARMS 136 can issue an alert to a target entity and/or can reject the query 112 by sending an error response back to the client device 108.

The alert that is issued to a target entity regarding an unauthorized use of a secure representation of a blockchain address can allow for identification of a security breach in a system (e.g., a security breach caused by a masquerading attack or other type of attack).

In addition to the foregoing tasks, the ARMS 136 can track and log all requests, irrespective of success or failure of the requests. For example, the ARMS 136 can log approval of access of the response information by a client entity, and log a respective privilege level of the response information. In addition, the ARMS 136 can update a block of a blockchain for a transaction that includes the approval of access to the response information.

Figure 2:
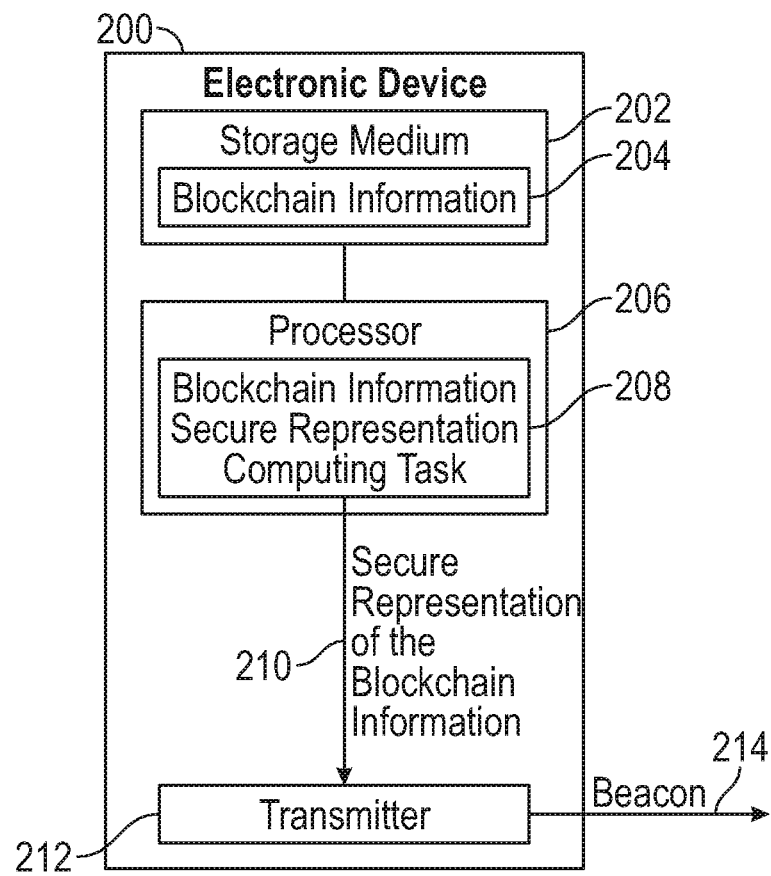
FIG. 2 is a block diagram of an electronic device according to some examples.

FIG. 2 is a block diagram of an electronic device 200, which can be the constrained device 102 of FIG. 1 or another electronic device. The electronic device 200 includes a non-transitory storage medium 202 storing blockchain information 204, and a processor 206 to perform a blockchain information secure representation computing task 208 that computes a secure representation 210 of the blockchain information based on applying a cryptographic function to the blockchain information. A processor can include a microprocessor, a core of a multi-core microprocessor, a microcontroller, a programmable integrated circuit, a programmable gate array, or another hardware processing circuit. A processor performing a task can refer to one processor performing the task, or multiple processors performing the task.

The electronic device 200 further includes a transmitter 212 to transmit a beacon 214 including the secure representation 210 of the blockchain information.

Figure 3:
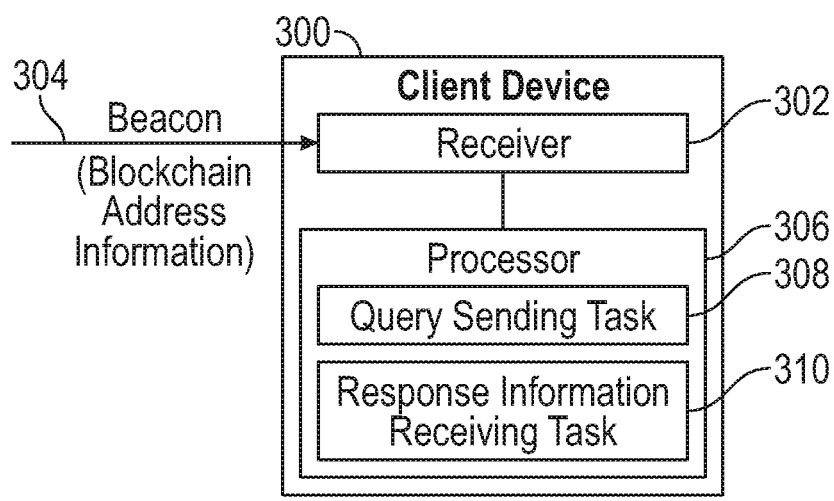
FIG. 3 is a block diagram of a client device according to further examples.

FIG. 3 is a block diagram of a client device 300 according to some examples, which can be the client device 108 of FIG. 1 or another client device. The client device 300 includes a receiver 302 to receive a beacon 304 from an electronic device, the beacon 304 including information based on a blockchain address associated with an entity of the electronic device.

The client device 300 further includes a processor 306 to perform various tasks, including a query sending task 308 to send, to a server (e.g., the smart contract manager 116 of FIG. 1 or another entity), a query including the information based on the blockchain address. The tasks also include a response information receiving task 310 to receive, from the server, response information responsive to the query, the response information relating to the electronic device.

Figure 4A:
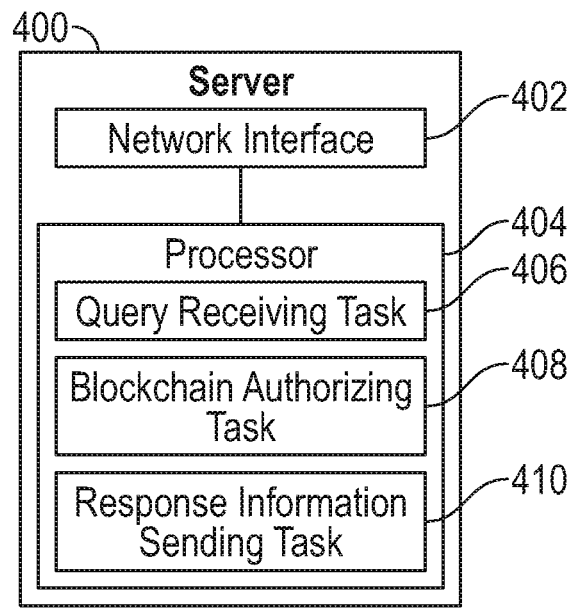
FIGS. 4A and 4B are block diagrams of servers according to additional examples.

FIG. 4A is a block diagram of a server 400 according to some examples, which can be the smart contract manager 116 of FIG. 1 or another server. The server 400 includes a network interface 402 to communicate with a client device. In addition, the server 400 includes a processor 404 to perform various tasks. The tasks include a query receiving task 406 to receive a query including information based on blockchain information associated with an entity of an electronic device that transmitted the information based on the blockchain address to the client device. The tasks further include a blockchain authorizing task 408 to determine, according to the information based on blockchain information, whether the client device is authorized to receive response information responsive to the query, the response information relating to the electronic device. The tasks further include a response information sending task 410 to, in response to determining that the client device is authorized to receive the response information, send the response information to the client device.

Figure 4B:
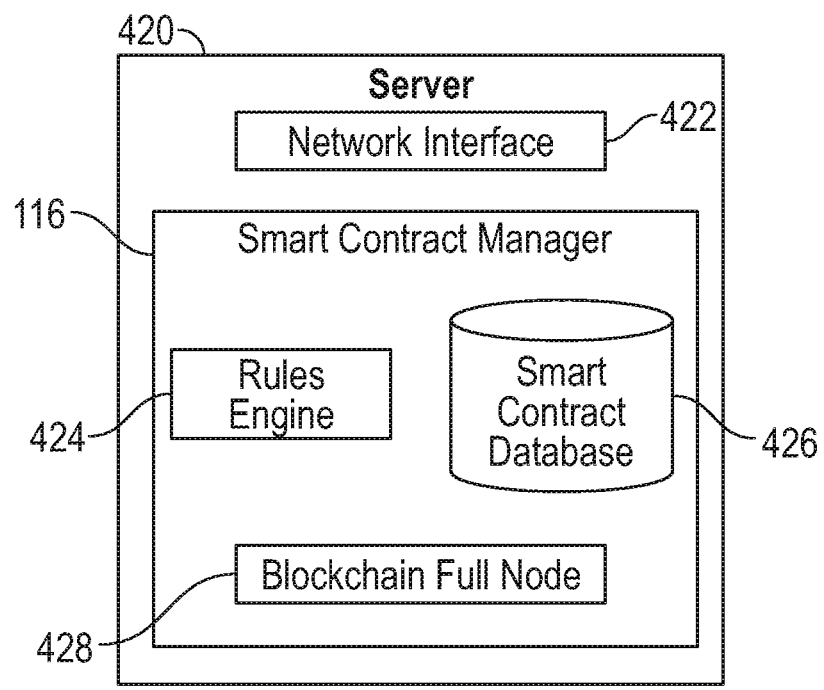

FIG. 4B is a block diagram of a server 420 according to further examples, which can include the smart contract manager 116 of FIG. 1. The server 420 includes a network interface 422 to communicate with a client device. The smart contract manager 116 can receive a query including information based on blockchain information associated with an entity of an electronic device that transmitted the information based on the blockchain address to the client device. The smart contract manager 116 includes a rules engine 424 that determines, according to the information based on blockchain information, whether the client device is authorized to receive response information responsive to the query. This determination can be made by the rules engine 424 based on a smart contract of a smart contract database 426 of smart contracts. The rules engine 424 can approve or disapprove the query based on the smart contract.

The smart contract manager 116 further includes a blockchain full node 428 that is able to participate in the blockchain network 128 and query the blockchain and/or distributed storage systems to retrieve response information for a query from a client device. The blockchain full node 428 can also make payments if applicable. The blockchain full node 426 can also create new blocks to store additional transaction data. In addition, the data of the blockchain can be stored as logs that can be accessible by client devices.

Once the requested information is obtained from the blockchain network 128, the smart contract manager 116 sends the response information to the client device.

In some examples, techniques can be implemented using machine-readable instructions executable on a processor. Instructions executable on a processor can refer to instructions executable on a single processor or executable on multiple processors. The machine-readable instructions can be stored in a storage medium, which can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Storage can be located on premise, off premise, at a managed service provider, in a private or public cloud, or any combination thereof.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. An electronic device comprising:
   a non-transitory storage medium storing a blockchain address;
   a processor to compute a secure representation of the blockchain address based on applying a cryptographic function to the blockchain address, wherein the blockchain address comprises an identifier of an entity associated with the electronic device, and wherein the cryptographic function is a time-based cryptographic function that produces different secret values based on the blockchain address and respective different time values; and
   a transmitter to transmit a beacon comprising the secure representation of the blockchain address.

2. The electronic device of claim 1, wherein the electronic device is a constrained device.

3. The electronic device of claim 1, wherein the blockchain address is pre-configured in the electronic device or obtained from a remote source by the electronic device.

4. The electronic device of claim 1, wherein the non-transitory storage medium stores the blockchain address by storing an encrypted version of the blockchain address.

5. The electronic device of claim 4, wherein the processor is to retrieve the encrypted version of the blockchain address, decrypt the encrypted version of the blockchain address to obtain a decrypted blockchain address, and apply the cryptographic function to the decrypted blockchain address to produce the secure representation of the blockchain address.

6. A client device comprising:
a receiver to receive a beacon from an electronic device, the beacon comprising information based on a blockchain address associated with an entity of the electronic device, wherein the information based on the blockchain address comprises a secret value derived based on applying a cryptographic function on the blockchain address and a time value; and
a processor to:
send, to a server, a query comprising the information based on the blockchain address, wherein the query comprises the secret value; and
receive, from the server, response information responsive to the query, the response information relating to the electronic device.

7. The client device of claim 6, wherein the blockchain address comprises an identifier of the entity associated with the electronic device.

8. The client device of claim 6, wherein the processor is to receive the response information from the server responsive to the server determining that the client device is authorized to receive the response information.

9. The client device of claim 6, wherein the server is a smart contract manager to enforce a smart contract among a plurality of entities, the plurality of entities comprising a first entity associated with the client device, and a second entity that manages information sought by the client device.

10. A server comprising:
a network interface to communicate with a client device; and
a processor to:
receive a query comprising a secret value derived from applying a cryptographic function on a blockchain address of an entity associated with an electronic device that transmitted the blockchain address to the client device, wherein the blockchain address comprises an identifier of the entity associated with the electronic device;
obtain the blockchain address of the entity associated with the electronic device in response to the secret value;
determine, according to the obtained blockchain address, whether the client device is authorized to receive response information responsive to the query, the response information relating to the electronic device;
in response to determining that the client device is authorized to receive the response information, send the response information to the client device;
detect unauthorized use of the secret value based on the blockchain address of the entity associated with the electronic device, wherein the detecting of the unauthorized use comprises at least one selected from among:
detecting reuse of the secret value based on the blockchain address of the entity associated with the electronic device that has previously been used,
detecting that the secret value based on the blockchain address of the entity associated with the electronic device is used outside a specified time range, or
detecting that the secret value based on the blockchain address of the entity associated with the electronic device is used outside a specified location; and
take a security action responsive to the detecting.

11. The server of claim 10, wherein the determining is based on a smart contract applicable for the client device.

12. The server of claim 10, further comprising:
a blockchain node to:
send a request to a blockchain to obtain the response information or to a distributed storage system to obtain the response information, and
create a new block of the blockchain to store further transaction information.

13. The server of claim 10, wherein the processor is to:
obtain the response information based on the blockchain address of the entity associated with the electronic device prior to sending the response information to the client device.

14. The server of claim 13, wherein the obtaining of the blockchain address of the entity associated with the electronic device in response to the secret value is based on use of a mapping between different secret values and corresponding blockchain addresses.

15. The server of claim 14, wherein the mapping comprises a lookup data structure comprising entries, each entry of the entries mapping a corresponding secret value to a respective blockchain address.

16. The server of claim 10, wherein the processor is to:
obtain the response information based on a smart contract among a plurality of entities, the plurality of entities comprising a first entity associated with the client device, and a second entity that manages information sought by the client device, wherein the smart contract is identified based on the blockchain address and an identifier of an entity associated with the client device.

17. The server of claim 16, wherein the processor is to interact with a network-based identity server to obtain the smart contract, the processor to send the blockchain address and the identifier of the entity associated with the client device to the network-based identity server to cause the network-based identity server to identify the smart contract.

* * * * *